(12) United States Patent
Hoelscher et al.

(10) Patent No.: US 11,881,000 B2
(45) Date of Patent: *Jan. 23, 2024

(54) SYSTEM AND METHOD FOR SIMULTANEOUS CONSIDERATION OF EDGES AND NORMALS IN IMAGE FEATURES BY A VISION SYSTEM

(71) Applicant: Cognex Corporation, Natick, MA (US)

(72) Inventors: Andrew Hoelscher, Somerville, MA (US); Simon Barker, Sudbury, MA (US); Adam Wagman, Stow, MA (US); David J. Michael, Waban, MA (US)

(73) Assignee: Cognex Corporation, Natick, MA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/208,990

(22) Filed: Mar. 22, 2021

(65) Prior Publication Data

US 2021/0366153 A1 Nov. 25, 2021

Related U.S. Application Data

(63) Continuation of application No. 15/901,117, filed on Feb. 21, 2018, now Pat. No. 10,957,072.

(51) Int. Cl.
*G06T 7/73* (2017.01)
*H04N 13/275* (2018.01)
(Continued)

(52) U.S. Cl.
CPC .............. *G06T 7/75* (2017.01); *G06F 18/22* (2023.01); *G06T 7/344* (2017.01); *G06T 17/10* (2013.01);
(Continued)

(58) Field of Classification Search
CPC G06T 7/75; G06T 7/344; G06T 17/10; G06T 2207/10012; G06T 2207/10028;
(Continued)

(56) References Cited

U.S. PATENT DOCUMENTS

| 5,028,138 A | 7/1991 | Wolff |
| 5,078,496 A | 1/1992 | Parker |

(Continued)

FOREIGN PATENT DOCUMENTS

| JP | 2014528057 | 10/2014 |
| JP | 2016186488 A | 10/2016 |

(Continued)

OTHER PUBLICATIONS

Holz et al., "Registration With the Point Cloud Library PCL—A Modular Framework for Aligning 3D Point Clouds", Sep. 17, 2015, pp. 1-13, Published in: USA.

(Continued)

*Primary Examiner* — Ali Bayat
(74) *Attorney, Agent, or Firm* — Loginov & Associates, PLLC

(57) ABSTRACT

This invention applies dynamic weighting between a point-to-plane and point-to-edge metric on a per-edge basis in an acquired image using a vision system. This allows an applied ICP technique to be significantly more robust to a variety of object geometries and/or occlusions. A system and method herein provides an energy function that is minimized to generate candidate 3D poses for use in alignment of runtime 3D image data of an object with model 3D image data. Since normals are much more accurate than edges, the use of normal is desirable when possible. However, in some use cases, such as a plane, edges provide information in relative directions the normals do not. Hence the system and method defines a "normal information matrix", which represents the directions in which sufficient information is present. Performing (e.g.) a principal component analysis (PCA) on this matrix provides a basis for the available information.

19 Claims, 9 Drawing Sheets

(51) Int. Cl.
*G06T 17/10* (2006.01)
*G06T 7/33* (2017.01)
*G06V 30/24* (2022.01)
*G06F 18/22* (2023.01)
*G06V 10/77* (2022.01)
*G06V 10/44* (2022.01)
*G06V 20/64* (2022.01)

(52) U.S. Cl.
CPC .......... *G06V 10/44* (2022.01); *G06V 10/7715* (2022.01); *G06V 20/653* (2022.01); *G06V 30/2504* (2022.01); *H04N 13/275* (2018.05); *G06T 2207/10012* (2013.01)

(58) Field of Classification Search
CPC .............. G06T 19/006; G06T 19/20; G06T 2219/2004; G06K 9/6215; G06V 30/2504; G06V 10/44; G06V 10/7715; G06V 20/653; H04N 13/275; H04N 13/239; H04N 2013/0074
USPC ....................................................... 382/154
See application file for complete search history.

(56) References Cited

U.S. PATENT DOCUMENTS

| | | | |
|---|---|---|---|
| 5,557,324 A | 9/1996 | Wolff | |
| 5,781,230 A | 7/1998 | Nguyen | |
| 6,064,759 A | 5/2000 | Buckley | |
| RE37,752 E | 6/2002 | Wolff | |
| 6,504,957 B2 | 1/2003 | Nguyen | |
| 6,539,107 B1 | 3/2003 | Michael | |
| 6,701,005 B1 | 3/2004 | Nichani | |
| 7,756,325 B2 | 7/2010 | Vetter | |
| 7,929,775 B2 | 4/2011 | Hager | |
| 8,401,225 B2 | 3/2013 | Newcombe | |
| 8,442,304 B2 | 5/2013 | Marrion | |
| 9,256,806 B2 | 2/2016 | Aller | |
| 9,443,297 B2 | 9/2016 | Beaudoin | |
| 9,557,162 B2 | 1/2017 | Rodriguez | |
| 9,870,624 B1 | 1/2018 | Narang | |
| 10,217,277 B2 | 2/2019 | Robert | |
| 10,309,778 B2 | 6/2019 | Zhang | |
| 10,339,706 B2 | 7/2019 | Black | |
| 10,368,960 B2 | 8/2019 | Wu | |
| 2002/0004710 A1 | 1/2002 | Murao | |
| 2004/0184653 A1 | 9/2004 | Baer | |
| 2005/0180623 A1 | 8/2005 | Mueller | |
| 2005/0286767 A1 | 12/2005 | Hager | |
| 2006/0267978 A1 | 11/2006 | Litke | |
| 2008/0137949 A1 | 6/2008 | Zouhar | |
| 2009/0116697 A1 | 5/2009 | Shalaby | |
| 2009/0310828 A1 | 12/2009 | Kakadiaris | |
| 2010/0315419 A1 | 12/2010 | Baker | |
| 2012/0099395 A1 | 4/2012 | Debrunner | |
| 2012/0262455 A1 | 10/2012 | Watanabe | |
| 2012/0314031 A1 | 12/2012 | Shotton | |
| 2013/0156262 A1 | 6/2013 | Taguchi | |
| 2013/0223673 A1 | 8/2013 | Davis | |
| 2014/0037194 A1* | 2/2014 | Kitamura | G06T 7/344 382/154 |
| 2014/0052555 A1 | 2/2014 | Macintosh | |
| 2014/0267229 A1 | 9/2014 | Ding | |
| 2014/0267614 A1 | 9/2014 | Ding | |
| 2014/0293091 A1 | 10/2014 | Rhoads | |
| 2015/0003669 A1* | 1/2015 | Solgi | G06V 10/76 382/103 |
| 2015/0016712 A1 | 1/2015 | Rhoads | |
| 2016/0171754 A1 | 6/2016 | Ahn | |
| 2016/0203387 A1 | 7/2016 | Lee | |
| 2016/0247017 A1 | 8/2016 | Sareen | |
| 2017/0032567 A1* | 2/2017 | Park | G06T 15/80 |
| 2017/0143494 A1* | 5/2017 | Mahfouz | A61F 2/4657 |
| 2017/0289341 A1 | 10/2017 | Rodriguez | |
| 2017/0358048 A1* | 12/2017 | Kotake | G06T 1/0007 |
| 2018/0053040 A1* | 2/2018 | Al-Osaimi | G06V 20/653 |
| 2018/0096537 A1* | 4/2018 | Kornilov | G06V 20/20 |
| 2019/0213739 A1* | 7/2019 | Ohba | G06T 7/74 |

FOREIGN PATENT DOCUMENTS

| | | |
|---|---|---|
| WO | 9740342 A2 | 10/1997 |
| WO | 2001078005 A2 | 10/2001 |
| WO | 2013033442 A1 | 3/2013 |

OTHER PUBLICATIONS

Holz et al., "Registration With the Point Cloud Library PCL", "Robotics and Automation Magazine", Sep. 16, 2015, pp. 110-124, Publisher: IEEE, Published in: US.

Nayar et al., "Diffuse Structured Light", Apr. 28-29, 2015 Conference, pp. 1-10, Publisher: Columbia University, Published in: US.

* cited by examiner

SYSTEM AND METHOD FOR SIMULTANEOUS CONSIDERATION OF EDGES AND NORMALS IN IMAGE FEATURES BY A VISION SYSTEM

FIELD OF THE INVENTION

This invention relates to machine vision systems and more particularly to vision systems that identify and align three-dimensional (3D) image features with respect to a trained 3D pattern.

BACKGROUND OF THE INVENTION

Machine vision systems, also termed "vision systems" herein, are used to perform a variety of tasks in a manufacturing environment. In general, a vision system consists of one or more camera assemblies with an image sensor (or "imager") that acquires grayscale or color images of a scene that contains an object under manufacture. Images of the object can be analyzed to provide data/information to users and associated manufacturing processes. The data produced by the camera is typically analyzed and processed by the vision system in one or more vision system processors that can be purpose-built, or part of one or more software application(s) instantiated within a general purpose computer (e.g. a PC, laptop, tablet or smartphone).

Common vision system tasks include alignment and inspection. In an alignment task, vision system tools, such as the well-known PatMax® system commercially available from Cognex Corporation of Natick, MA, compare features in a two-dimensional (2D) image of a scene to a trained (using an actual or synthetic model) 2D pattern, and determine the presence/absence and pose of the 2D pattern in the 2D imaged scene. This information can be used in subsequent inspection (or other) operations to search for defects and/or perform other operations, such as part rejection.

A particular task employing vision systems is the alignment of a three-dimensional (3D) target shape during runtime based upon a trained 3D model shape. 3D cameras can be based on a variety of technologies—for example, a laser displacement sensor (profiler), a stereoscopic camera, a sonar, laser or LIDAR range-finding camera, time-of-flight camera, and a variety of other passive or active range-sensing technologies. Such cameras produce a range image wherein an array of image pixels (typically characterized as positions along orthogonal x and y axes) is produced that also contain a third (height) dimension for each pixel (typically characterized along a z axis perpendicular to the x-y plane). Alternatively, such cameras can generate a point cloud representation of an imaged object. A point cloud is a collection of 3D points in space where each point i can be represented as (Xi, Yi, Zi). A point cloud can represent a complete 3D object including the object's back and sides, top and bottom. 3D points (Xi, Yi, Zi) represent locations in space where the object is visible to the camera. In this representation, empty space is represented by the absence of points.

By way of comparison, a 3D range image representation Z(x, y) is analogous to a 2D image representation I(x, y) where the depth or height Z replaces what would be the brightness/intensity I at a location x, y in an image. A range image exclusively represents the front face of an object that is directly facing a camera, because only a single depth is associated with any point location x, y. The range image typically cannot represent an object's back or sides, top or bottom. A range image typically has data at every location (x, y) even if the camera is free of information at such locations. It is possible to convert a range image to a 3D point cloud in a manner clear to those of skill.

In aligning a target image, either acquired or generated by a synthetic (e.g. CAD) process, to a model image (also either acquired or synthetic), one approach involves the matching/comparison of the target 3D point cloud to the model in an effort to find the best matching pose. The comparison can involve a scoring of the coverage of the target with respect to the model. A score above a certain threshold is considered an acceptable match/pose-estimation, and this information is used to generate an alignment result. It is nevertheless challenging to accurately and efficiently generate an alignment result based upon 3D images.

Aligning 3D objects in 3D range images or 3D point cloud images is best accomplished with one or more, respective, 3D alignment (registration) algorithm(s) that is/are appropriate for the 3D shape of those objects. If an inappropriate 3D alignment algorithm is used, the 3D alignment procedure may fail or perform poorly either by finding an incorrect result pose or finding no result at all. More particularly, a technique termed Iterative Closest Point (ICP) is a classic approach for refining pose estimates for point cloud alignment/registration. It uses a set of features such as point positions or point normals, to iteratively refine a coarse pose into a final pose. One choice that must be made is the metric that the ICP routine will minimize. Standard choices are point-to-line, where the ICP process minimizes the sum of the distances from source points to their nearest edge, and point-to-plane, where the ICP process minimizes the sum of the distances from the source points to planes through their nearest target point, represented by the normal at the target point. However, it is recognized that neither metric is particularly satisfactory, for various reasons. For example, in the use case of aligning a plane to a plane, if the point-to-plane metric is employed, then the system can determine offset and rotation about the normal, but provides no information about the rotation around the normal. The point-to-line metric also exhibits other drawbacks that should be clear to those of skill.

SUMMARY OF THE INVENTION

This invention overcomes disadvantages of the prior art by dynamically weighting between a point-to-plane and point-to-edge metric, on a per-edge basis, in an acquired image using a vision system. This allows an applied ICP technique to be significantly more robust to a variety of object (part) geometries and/or occlusions. In an embodiment, a system and method herein provides an energy function that is minimized to generate candidate 3D poses for use in alignment of runtime 3D image data of an object with model 3D image data. Since normals are much more accurate than edges, the use of normal is desirable when possible. However, in some use cases, such as a plane, edges provide information in relative directions the normals do not. Hence the system and method defines a "normal information matrix", which is a matrix that represents the directions in which sufficient information is present. Performing (e.g.) a principal component analysis (PCA) on this matrix provides a basis for the available information. Illustratively, each edge is then evaluated by the amount of information it contributes in each respective direction, as well as the information that is already available. If the edge contributes significant information in a direction that is significant to the analysis, then that edge is assigned a high weight in the computation (e.g. close to 1.0). Otherwise, the edge is assigned a relatively low weight (e.g. close to 0.0). This weighted data is processed using (e.g.) a linear minimization function that simultaneously (concurrently) minimizes the sum of the point-to-plane distances plus the sum of the point-to-edge distances. Advantageously, this procedure exclusively (only) employs the (typically) less-accurate edges when the geometry of the object requires it for proper pose determination. Note also that the object herein can be a section of a planar surface. Hence, for example, in the use case of a plane, the system and method can employ normals to establish the three degrees of freedom (DOFs) that the normals in which normal typically provide information (e.g. the two tilts and the offset along that plane's normal), and then uses the edges for the remaining DOFs (e.g. the two translations inside the plane and the rotation about the normal). Conversely, employing the point-to-line metric, on its own, typically generates results that are substantially less accurate, while employing only the point-to-plane metric is also not robust.

In an illustrative embodiment, a system and method for finding the pose of a 3D model in a 3D image of an object acquired by a 3D camera assembly is provided. The 3D model is processed by a vision system processor along with the acquired 3D image. A pose finding process/module, associated with the processor, simultaneously matches 3D edges in the 3D model to 3D edges in the 3D image and 3D normals in the 3D model to 3D normals in the 3D image to determine a 3D pose. Illustratively, the pose finding process/module applies weightings to 3D edges in the 3D image and 3D normals in the 3D image so as to weight use of 3D edges versus 3D normals in the image. The pose finding process can also determine whether (a) a plane of the object provides information about alignment in directions parallel to the 3D normals, and (b) edges of the object provide information about alignment in one or more directions perpendicular to the edges, respectively. It can also match at least one of (a) the 3D edges in the 3D model to 3D edges in the 3D image using a point-to-line metric, and (b) the 3D normals in the 3D model to the 3D normals in the 3D image using a point-to-plane metric. Additionally, the pose finding process can define a normal information matrix that represents the directions in which sufficient quantity of the information is present. A principal component analysis (PCA) can be performed on the matrix to identify the information, and determine availability thereof, for pose finding. The pose finding process can also comprise an evaluation process that evaluates the edges, respectively, for a quantity of the information contributed in respective directions and the information that is available. Illustratively, the evaluation process evaluates pose edges according to the following: (a) if one of the respective edges contribute a significant quantity of the information in a direction that is significant, then that one of the edges is assigned a high weight in the computation, and (b) if one of the respective edges does not contribute a significant quantity of the information in a direction that is significant, or if the direction is not significant, then that one of the edges is assigned a relatively low weight in the computation. Additionally, a linear minimization process can be provided, which simultaneously (concurrently) minimizes a sum of distances computed using the point-to-plane metric plus a sum of distances computed using the point-to-edge metric.

BRIEF DESCRIPTION OF THE DRAWINGS

The invention description below refers to the accompanying drawings, of which.

DETAILED DESCRIPTION

I. System Overview

Figure 1:
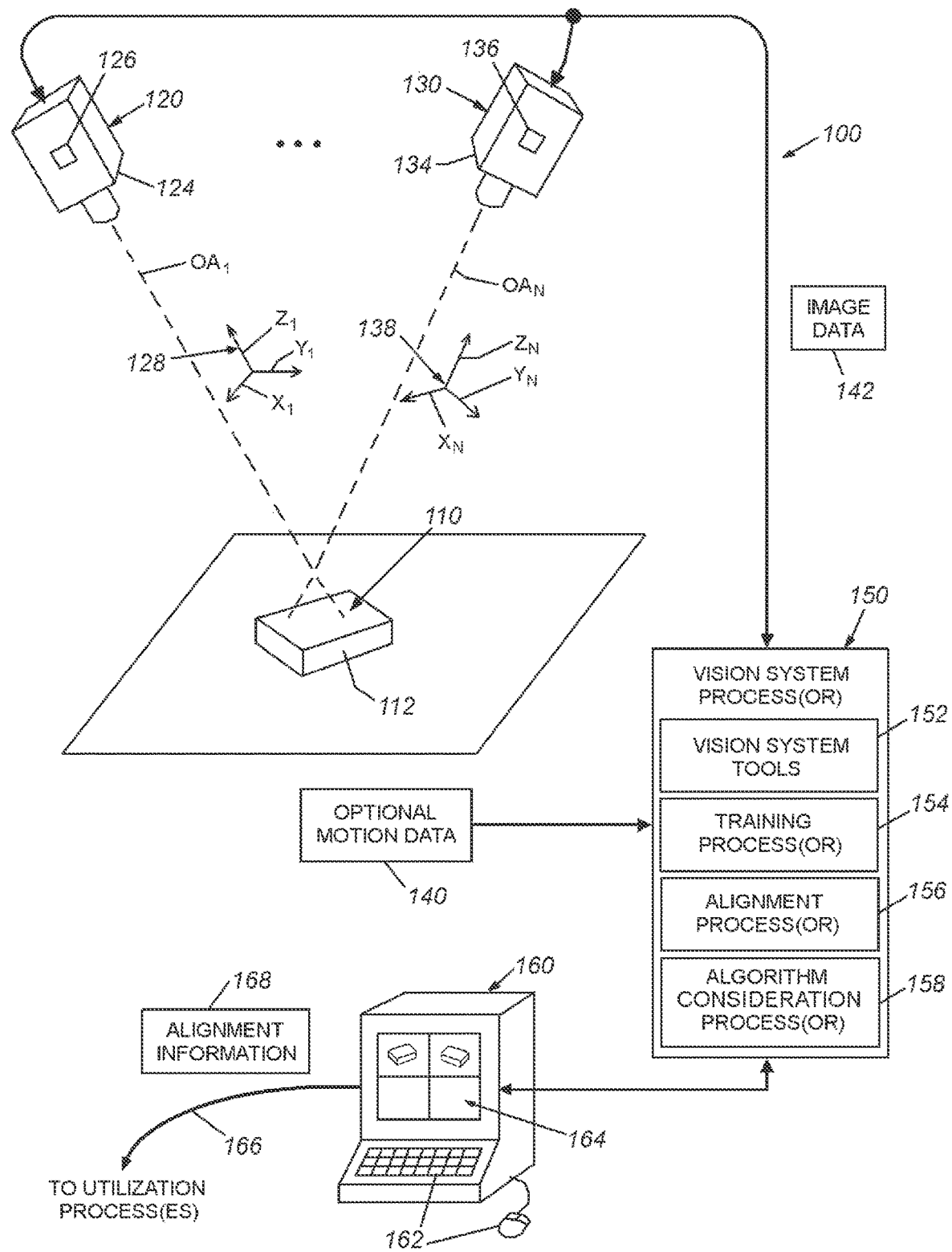
FIG. 1 is a diagram of a vision system including one or more 3D camera assemblies, acquiring an image of an object during training or runtime in which simultaneous alignment (registration) algorithms are employed by the vision system.

FIG. 1 shows a machine vision system arrangement (also termed herein, a "vision system") 100 for use in inspecting and/or analyzing features on the surface 112 of an object 110 that is imaged within the field of view (FOV) of one or more 3D vision system camera assemblies 120 and 130. Each camera assembly 120, 130 can be any acceptable arrangement of components for 3D imaging. The camera assemblies 120, 130 are each adapted to determine a third orthogonal dimension (e.g. height along the respective $z_1$, $z_N$ axis of each respective camera's coordinate system 128, 138) that constitutes a 3D "range image" of the object surface 112 (shown herein, by way of non-limiting example, as a cuboid shape). A variety of technologies can be employed to generate height data for respective image pixels such as a laser displacement sensor (profiler), a stereoscopic camera, a sonar, laser or LIDAR range-finding camera, time-of-flight camera and a variety of other passive or active range-sensing technologies. Note that only one camera assembly, or a larger number (e.g. three or more) of camera assemblies, can be employed in an overall arrangement and the term "3D camera assembly" can be used alternatively herein to describe the overall arrangement of one or more discrete 3D camera assemblies for generating a 3D point cloud or range image representation of the object surface.

While not shown, one exemplary type of 3D camera assembly employed to generate a 3D range image or point cloud is a laser displacement sensor, which projects a fan of laser light (or another structured illumination) at the object surface 112 to form a line (e.g. oriented across the x-axis direction), and receives reflected light at the laser displacement sensor's respective imager 126, 136 from the projected line at a relative (acute) angle (A) between the plane of the illumination fan and respective imager's optical axis OA1, OAN. As described, other modalities can be used to generate range or height information, including, for example, LIDAR, structured light systems, stereo vision systems (e.g. a pair of spaced cameras 120 and 130), DLP metrology, etc. These systems all generate an image that provides a height value (e.g. z-coordinate) to pixels.

In a typical arrangement, the 3D camera assembly 120 and/or object 110 can be in relative motion (e.g. in the physical y axis coordinate direction of one or more cameras) so that the object surface 112 is scanned by the laser displacement sensor(s), and a sequence of images are acquired of the laser line at desired spatial intervals—typically in association with a motion controller and associated encoder or other motion-measurement device (or, alternatively, at time based intervals) that delivers motion information 140 to the system vision processor (150, described below). In that respect, the position of a point on the object along the motion direction is defined as coordinate $Y_i$. The collection of points $(X_i, Y_i, Z_i)$ acquired by the 3D camera assembly is defined as the point cloud. In other embodiments, the 3D camera assembly is not in motion relative to the object.

The camera body 124, 134 can contain various image processing components that constitute a vision system processor 150 that operates an associated vision process. The vision processor 150 operates upon image data 142 based upon the acquired images of the scene and/or other sources (e.g. a CAD representation of a model), and can employ vision system tools and processes 152 to extract information from the acquired image. This information can relate to features of interest and other items appearing within the image—for example vision system tools such as the well-known PatMax®, available from Cognex Corporation of Natick, MA, can be used to analyze 2D and 3D features in the image and provide information on relative pose, alignment and other details—e.g. edges, blobs, etc. While some or all of the vision system processes can be instantiated within the body 124, 134 of the camera assembly 120, 130, it is expressly contemplated that some or all of the processes can be carried out by an interconnected (wired or wireless) computing device/processor 160, such as a purpose-built processor or a general purpose computer (e.g. server, PC, laptop, smartphone, tablet, etc.), with appropriate user interface (mouse/keyboard) 162 and/or display 164 (e.g. a touch screen). The interconnected computing device/processor 160 can employ the processed image data to carry out further utilization processes or tasks via a communication link 166 or other interface arrangement. For example, where the vision system carries out inspection tasks, the information can be used to provide quality control information to a database or to reject defective parts on a line. As described below, the utilization task includes use of 3D alignment information 168.

A training process(or) or module 154 handles the training and storage of one or more 3D models/representations composed of 3D range image or point cloud data that defines features that facilitate alignment of the model with found features from a runtime 3D range image or point cloud image of a runtime (target) object. The trained model(s) can encompass features found in an overall view of an object, different parts or orientations of a particular object, and/or multiple objects.

In the illustrative embodiment, the vision process and processor 150 includes an alignment process(or) or module 156 that employs an appropriate alignment algorithm (or process) that attempts to align the features of the model and those of the runtime (target) 3D image. The alignment process(or) 156 and training process(or) 154 each interoperate with a simultaneous algorithm consideration process (or) or module 158, which coordinates use of two or more 3D alignment algorithms based upon the model's 3D surface features. As used herein, the term "simultaneous" is by way of example of the general proposition that two or more sets of features and associated runtime pose determination procedures can be considered and/or operated concurrently, or within the same processing transaction, on an image, and thus, true simultaneity is not required.

II. Training 3D Models

Figure 2:
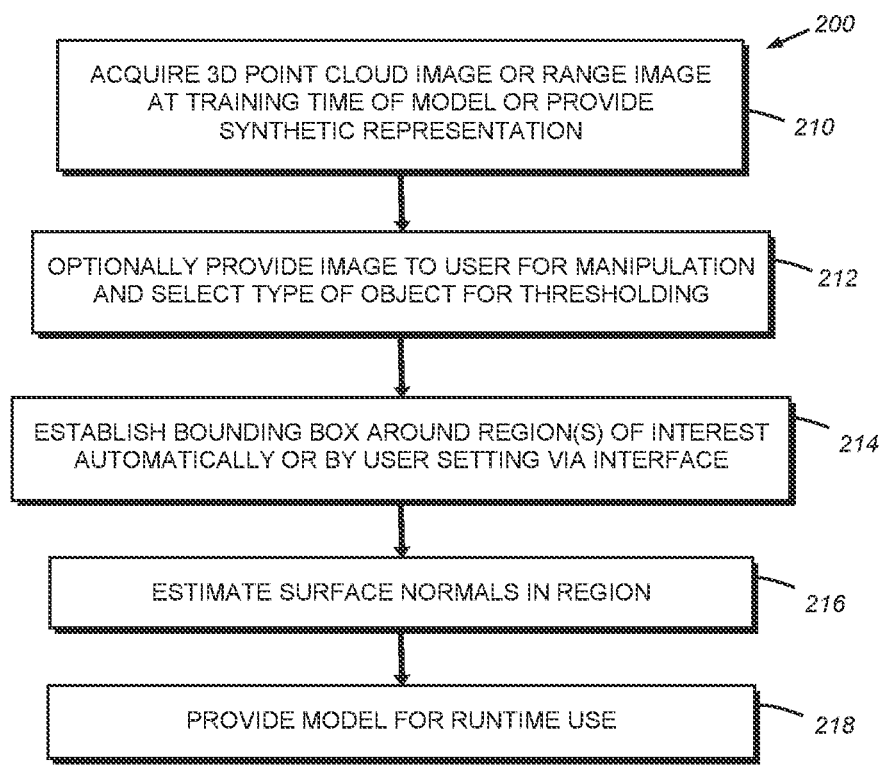
FIG. 2 is a flow diagram of an exemplary training procedure for model 3D image data for use in alignment of runtime, acquired image data according to an embodiment.

The system and method employs trained image data in an overall alignment process as described below. A generalized training procedure 200 is shown FIG. 2, in which the system acquires or is provided with an image of a model as a 3D point cloud or range image at training time. This image can be produced by imaging a scene containing a model/training object in one or more orientations, or providing a "synthetic" (e.g. CAD) representation of the object and/or portions thereof. The actual or synthetic image can be provided to a user via an interface as part of the training process in step 212. Note that step 212 is optional and the image can be provided directly to the system free of any user input as to the type of object or threshold settings. Alternatively, the thresholds can be set based upon automated identification of the type of object or surface features using vision system tools. Where the user interface is employed, the image can be displayed as shown generally in the display 300 of FIG. 3. The user can manipulate the image, including the placement of a bounding box around some, or all, of the training object (step 214) as depicted by the bounding boxes 310 and 320 around respective images 312 and 322. The size and shape of the bounding boxes can be determined by the user, or the regions of interest can be bounded via automated mechanisms that should be clear to those of skill. Alternatively, the regions of interest and corresponding training features can be provided by the source of CAD data, or by/with the image data by some other modality. By bounding the region of interest to be analyzed, the alignment process omits any model features that are not relevant to alignment and/or background features separate from the model. Alternatively, the entire acquired image can be used a model. In step 216 of the procedure 200 the algorithm selection process(or) (158 in FIG. 1) establishes surface normals on the features in the bounded regions of interest (see bounding boxes 310, 320 in FIG. 3). The resulting model is provided to the process for use during runtime alignment, described further below (step 218).

Figure 3:
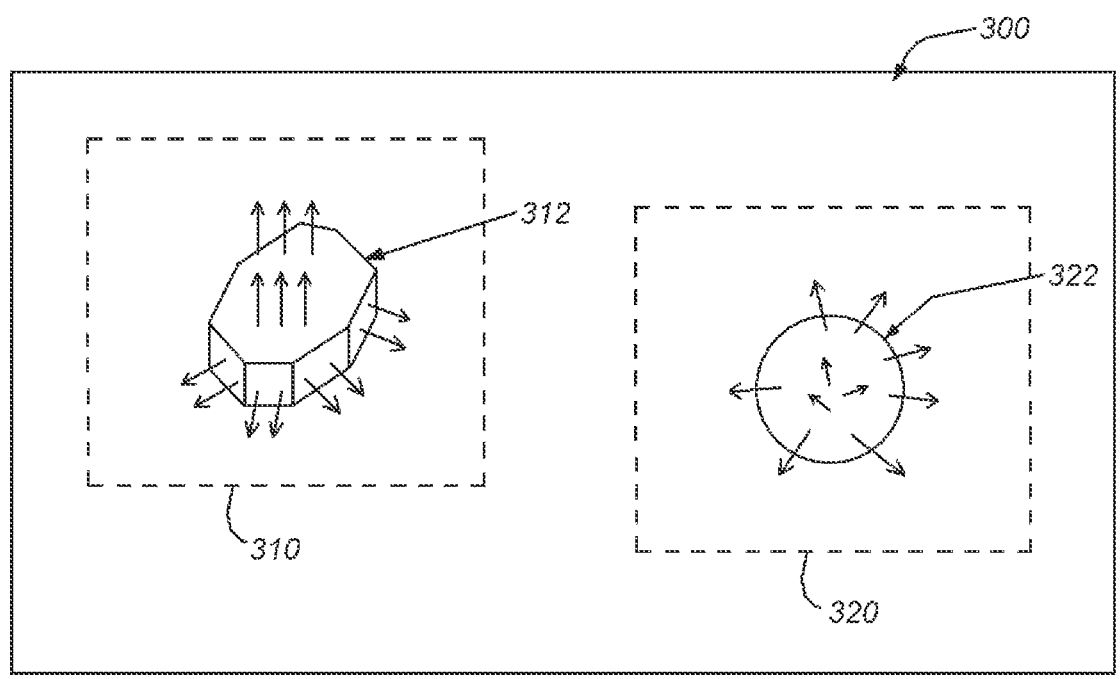
FIG. 3 is a diagram showing a training-time depiction of model 3D image data with exemplary bounding boxes provided around 3D feature sets in two different orientations and surface normals associated with the 3D surface geometry of each exemplary feature set, illustrating differences in the directions, and hence, the importance of information derived from each of the feature sets.

As shown in FIG. 3, the depicted surfaces (which are actually defined as a 3D range image or 3D point cloud) of models 312, 322 include sets of surface normals that represent the perpendiculars at local points along the respective surface. The granularity of normals is highly variable. In general, it can be part of the parameters specified by the user during training time or automatically determined by the alignment system during training time using (e.g.) techniques clear to those of skill. In general, the system can store sets of parameters for various types of surfaces and/or classes of objects that are commonly encountered by the system (e.g. bolts, balls, computer screen, circuit chips, bottles, cans, caps, etc.). Predetermined parameters are provided for such items. Alternatively, specific parameters can be set by the user for a particular model, or be determined automatically. Parameters can also be set for the specific orientation of the model. For example, a bottle will appear different viewed from its side than from its top.

III. Runtime Alignment

In an embodiment, during runtime, the consideration process 158 employs a normal-based alignment and an edge-based alignment algorithm concurrently (also termed "simultaneously") to perform fine alignment. This occurs after an initial coarse alignment step is used to roughly register the trained 3D model with the image data. The fine alignment process minimizes an energy function, as described in further detail below. Since normals are more accurate than edges, in general, they are used preferentially. However, in some cases, such as where a plane feature is analyzed, edges provide information to the process in directions that the normals do not. Thus, the process defines a "normal information matrix", which is a matrix that represents the directions for which information on the image feature is available. By way of example, a principal component analysis (PCA) on this matrix is employed to provide a basis for the information in the process. Each edge is then evaluated by the amount of information it contributes in each direction, as well as the information that the process already possesses. If that edge contributes significant information in a direction that is useful for alignment, then that edge is weighted highly (i.e. close to 1.0). Otherwise, its relative weight it low (i.e. close to 0.0). The weights are then subjected to a linear minimization function that minimizes the sum of the point-to-plane distances plus the sum of the weighted point-to-edge distances.

Advantageously, the above-described procedure employs the less-accurate edges exclusively (only) when the geometry of the 3D-imaged object requires it. For example, in the use case of a plane feature, normals can be employed by the system to fix the three degrees of freedom that the normals generally provide information about (that is, the two orthogonal tilt degrees and the offset along the plane's normal), and then employs the edges for the remaining degrees of freedom (DOFs) (that is, the two translations inside the plane and the rotation about the normal). Using the point-to-line metric on its own, provides a significantly less accurate result, and using the point-to-plane metric is not at all robust.

Figure 4:
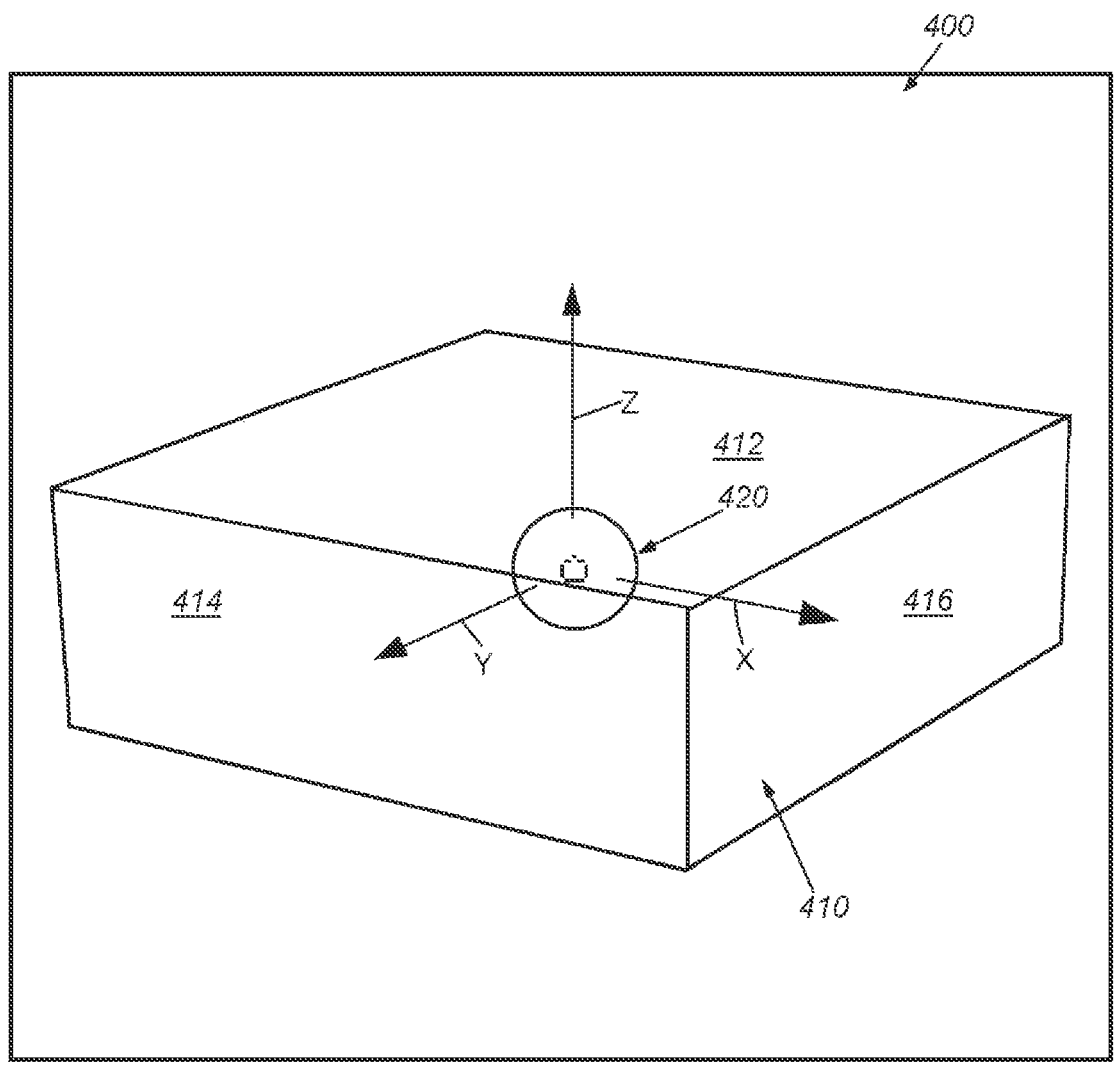
FIG. 4 is a diagram showing a cuboid-shaped object in a particular orientation in which the orientation of multiple planes and edges making up the shape can be determined from the acquired 3D image.
Figure 5:
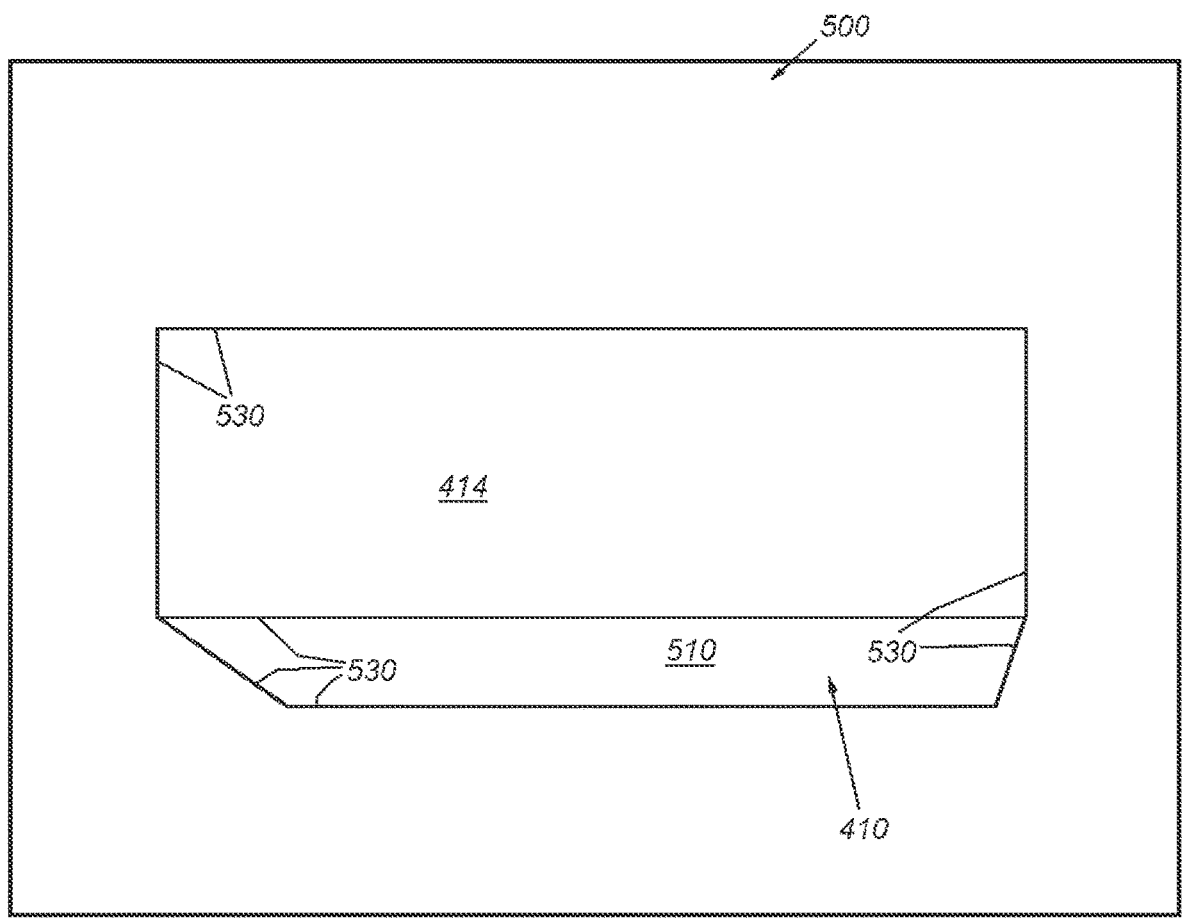
FIG. 5 is a diagram showing the cuboid shape of FIG. 4 oriented in a face-on orientation that differs from the depicted orientation of FIG. 4, in which fewer planes and edges can be accurately determined based upon the prevailing orientation.

By way of further description, when attempting to locate an instance of an object in a 3D scene, there are camera viewing angles and scene characteristics that typically result in missing information. If the object is described using a CAD file, then the object can be described fully, with every surface and associated feature fully specified. However, if the scene is acquired using a single 3D sensor, then the limitations of the sensor can restrict and limit the information available. For example, parts of the scene can block the object from being visible in its entirety and/or the object, itself, can occlude some of its own sections—e.g. the camera can image the front faces of the object, but not the rear faces. By way of illustration, reference is made to FIGS. 4 and 5, which each show an exemplary scene 400 and 500, respectively in which a cuboid-shaped box 410 is oriented viewed at differing angles/points-of-view (POVs). Faces 412 and 416 are shown in the scene 400 of FIG. 4. However with a change in POV in the scene 500 of FIG. 5, only face 414 is visible and a bottom face 510, not present in scene 400 is now also visible. This can limit the ability of the system to properly measure the object in 3D. More generally, the POV used to 3D-image the object 410, hence, can make it challenging to define object dimensions in all three orthogonal axes (420 in FIG. 4) of the coordinate system, due to the possibility of missing information.

A classic technique for refining pose estimates is iterative closest point (ICP). This procedure/algorithm uses a set of features, such as point positions or point normals, to iteratively refine a coarse pose into a final (fine) pose. One choice that must be made is the metric that the ICP routine will minimize. Standard choices are point-to-line, where the ICP process minimizes the sum of the distances from source points to their nearest edge, and point-to-plane, where the ICP process minimizes the sum of the distances from the source points to planes through their nearest target point, represented by the normal at the target point. In the ICP algorithm, one 3D point cloud, the reference, or target, is kept fixed, while the other 3D point cloud, the source, is transformed to best match the target. The reference and source can correspond to the trained model and the acquired, runtime object image. The ICP algorithm iteratively revises the transformation (combination of translation and rotation) needed to minimize the distance from the source to the reference point cloud. There can be an initial estimation of the transformation to align the source to the reference, and one or more criteria for stopping the iterations is/are also provided. The algorithm then outputs a refined transformation (result pose). In operation, the algorithm proceeds as follows:

For each point in the source point cloud, find the closest point in the reference point cloud;

estimate the combination of rotation and translation using a mean-squared error cost function that will best align each source point to its match found in the previous step;

transform the source points using the obtained transformation; and iterate, re-associating the points.

Note that the ICP algorithm can be particularly useful for certain object shapes where the surface normal distribution variance is high (for example, shape 322 in FIG. 3) (above a given "high" threshold). Conversely, a hybrid ICP and edge-feature-based algorithm is more desirable where a small variance (below a given "low" threshold) (for example, shape 312 in FIG. 3).

As such, if the cuboid/box-shape object 410 is aligned using the imaged scene 500 (FIG. 5), then the point-to-plane technique would fail. The information needed to do a full, correct alignment is (in fact) present in the imaged scene 500, but the point-to-plane metric cannot access that information, since the information is represented in the edges 530 of the object, and not the exposed planes 414 and 510. In this use case, the point-to-plane metric cannot distinguish between two results that just differ by a horizontal slide.

There are similar degeneracies when exclusively using the point-to-line metric on an imaged object such as the box 410. The challenge is that, because of the limitations of the 3D image sensor's POV, certain information is only available when specific features are considered. So to robustly align a wide variety of parts in a wide variety of orientations, more than one feature should be considered during the ICP refinement process.

A challenge overcome by the exemplary embodiment is a technique to provide an effective technique for combining multiple features into a single hybrid metric. Since the point-to-plane metric implicates distances to planes, and the point-to-line metric implicates distances to lines, the combination of such metrics into a single, global fit error that can be minimized is not straightforward. Additionally, a typical 3D image can contain many more normals than edges, and this characteristic should be accounted for, since otherwise, the contribution of the edges will be very small, generating, in essence, a point-to-plane metric (since the point-to-plane metric uses the plentiful normals and the point-to-line metric uses the scarce edges). The weight shifts substantially to the point-to-plane results because of this imbalance. Also, normals are (typically) fundamentally more accurate than the edges in the types of images commonly encountered in industrial vision system applications, and many more points can be averaged together to estimate a normal than can be grouped to estimate an edge. While the use of multiple (two or more) metrics is of less use in an academic setting or in literature related to ICP (in part due to the complexities of a hybrid implementation), it is recognized herein that the use of two or more metrics to analyze objects using ICP can be particularly desirable is desirable. That is, the limitations of a single metric (typically) only becomes problematic when aligning images of a multiplicity of objects in a multiplicity of relative orientations—which is the challenge particularly present in an industrial vision system environment, as addressed herein.

As described generally above, ICP operates iteratively, where each iteration consists of two stages: (a) corresponding features between the source and the destination data sets, and (b) minimizing a metric based on the corresponding features. The metric takes the form of a function whose inputs are feature correspondences, and whose output is a single number. The point-to-plane metric has the following function:

$$F = \Sigma((d_i - M^* s_i) \cdot n_i)^2$$

Where $d_i$ is the $i^{th}$ destination position, $s_i$ is the $i^{th}$ source position, $n_i$ is the $i^{th}$ source normal, M is the pose mapping the sources to the destinations, and · denotes the dot product.

The point-to-line metric has the following formula:

$$G = \Sigma \|((d_i - M^* s_i) \times u_i)\|^2$$

The symbol $u_i$ is the $i^{th}$ edge direction, and × denotes the cross product. In general the above-described relationship should be clear to those of skill. In an exemplary embodiment the hybrid metric H is now contributed to the relationship consisting of the equation:

$$H = \Sigma((d_i - M^* s_i) \cdot n_i)^2 + \Sigma \alpha_i \|((d_i - M \cdot s_i) \times u_i)\|^2$$

This metric value H consists of the sum of the point-to-plane and the point-to-line metric, with a new per-edge-correspondence weight term, $\alpha_i$. Illustratively, these weights are computed dynamically during each iteration, and are not precomputed or stored ahead of time. Each weight is a non-negative number, and represents how important the correspondence is to finding a good pose (where higher numbers indicate higher importance). The following is a description of how weights are calculated according to an embodiment.

Figure 6:
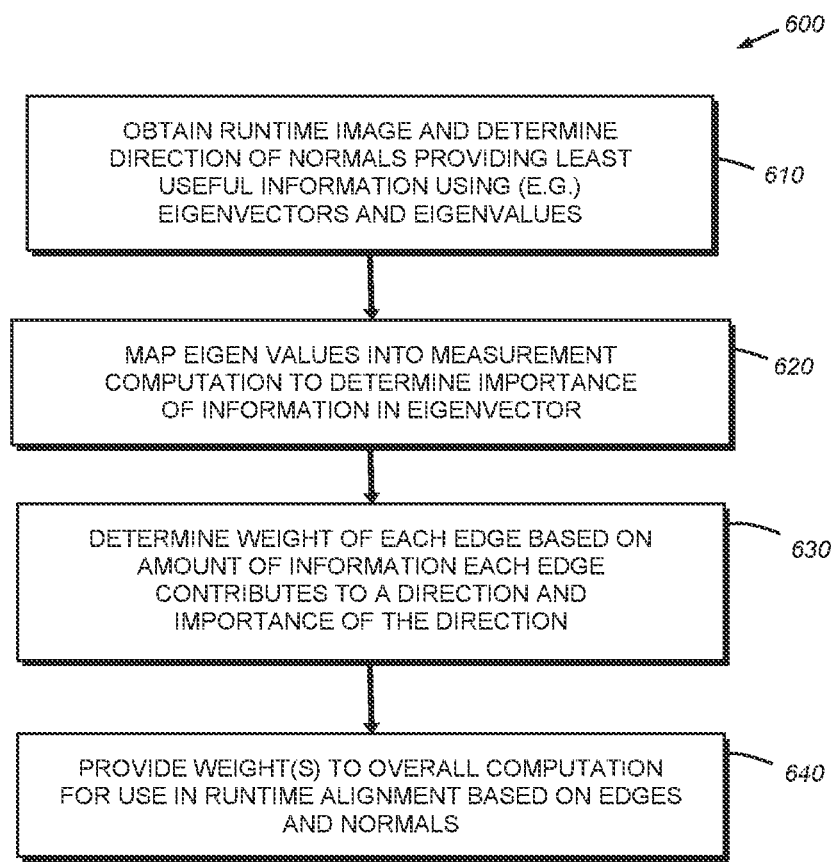
FIG. 6 is a flow diagram of a procedure for runtime weighting of edges and normal in an acquired 3D image of an object to be aligned versus the model data of FIG. 2, so as to consider that applicability of each of a plurality of 3D alignment algorithms.

Calculating the weights takes into account at least two considerations: (a) a plane of an object provides information about the alignment in directions parallel to the normal, and (b) an edge of an object provides information about the alignment in directions perpendicular to the edge. Based upon these considerations and the preference to employ normals rather than the edges if sufficient information is present, then the procedure 600 applies, with reference to FIG. 6. First, using the acquired runtime image, the directions where the normals provide the least amount of information are computed in step 610. This can be accomplished using a principal component analysis on the normal. By way of non-limiting example, this procedure finds the three eigenvectors of the matrix calculated by $\Sigma n_i^* n_i^T$. This approach thereby outputs three eigenvectors and eigenvalues. The eigenvalues provide a number indicating how much information is present in the direction of the eigenvalue's eigenvector (where eigenvalues close to zero indicate low information, and larger eigenvalues indicate more information). An appropriate threshold can be used to determine the cutoff as the when sufficient information is present.

Figure 7:
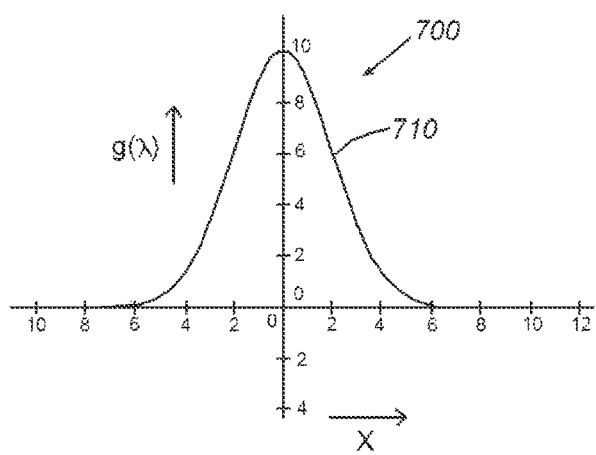
FIGS. 7-7D are graphs showing exemplary plots of the Gaussian function g(λ) versus eigenvalue λ relative to the weighting procedure of FIG. 6.
Figure 7A:
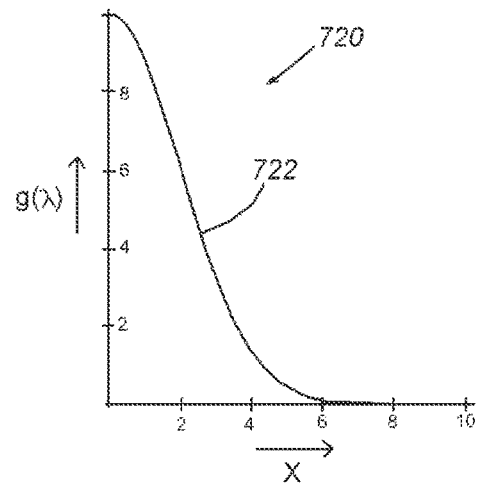

More particularly, in step 620 of the procedure 600, the eigenvalues are mapped into a measurement computation that determines the degree of importance ascribed to that eigenvector. This can be accomplished by mapping the eigenvalue λ through the Gaussian function $f(x; a, b, c)$, also characterized as $g(\lambda)$, $$f(x; a, b, c) = a * e^{-\frac{(x-b)^2}{2*c^2}}$$

where a basic distribution curve 710 is shown in the graph 700 of FIG. 7, and the three constants a, b, and c are numbers that define the shape of the Gaussian. The first, a, is the value of the highest point of the curve; b defines the translation along the x axis; c defines the width of the curve. In an exemplary implementation, a can be set to 10, b to zero, and c to 2 (so the denominator of the exponent equals 8). However, since the illustrative eigenvalues λ are always positive for the present use case, the left-hand side of the curve 710 can be ignored, yielding the depicted graph 720, and associated positive-value curve 722 in FIG. 7A. This represents an exemplary distribution for use in an embodiment of the system and method herein. The x axis represents the eigenvalue, and the y axis is a constant that is used to multiply the weights of edges when considering this direction. So, in this case, if the eigenvalue for a particular eigendirection is very small, the weight multiplier can equal approximately 10, and if the eigenvalue for a particular eigendirection is very large, then the weight multiplier can approach 0. Hence, if an edge contributes information in a direction whose eigenvalue is large (i.e. if significant information is already present for that direction), then that edge is assigned a low weight (since the weight multiplier is low). Conversely, if an edge contributes information in a direction whose eigenvalue is small (i.e., in a direction for which little or no information is yet available), then its weight is large (since the weight multiplier is high). More generally, a variety of functions whose (a) output is large when the input is small, (b) output is small when the input is large, (c) is continuous, and (d) is monotonically decreasing can be employed in alternate embodiments. In an example, a downwardly sloped line can provide a workable function). Thus, the above-described Gaussian function is a convenient and effective mechanism for achieving the desired goal, based upon the particular values employed for the parameters a, b and c. The parameters can be set to another value to achieve the desired result—for example c can be set to 2.5.

By changing the a parameter, the weight edges can be controlled as to when they will contribute information in a new direction. Note, if a equals 100, then edges become significantly more significant than normals. Conversely, if a equals 1, then edges become less significant than the present implementation.

Figure 7B:
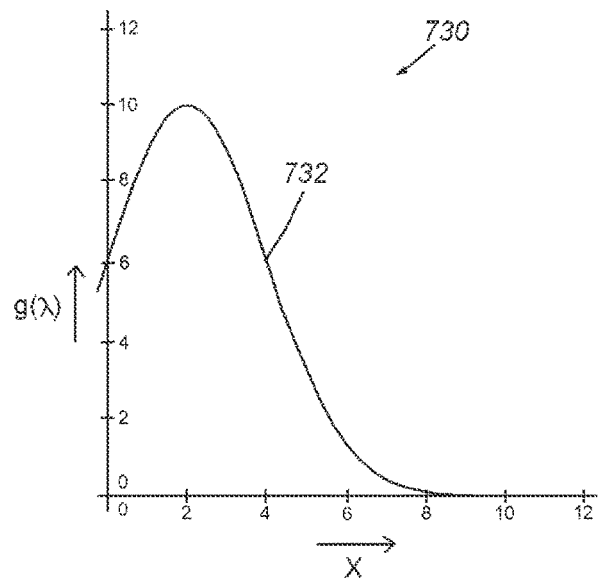
Figure 7C:
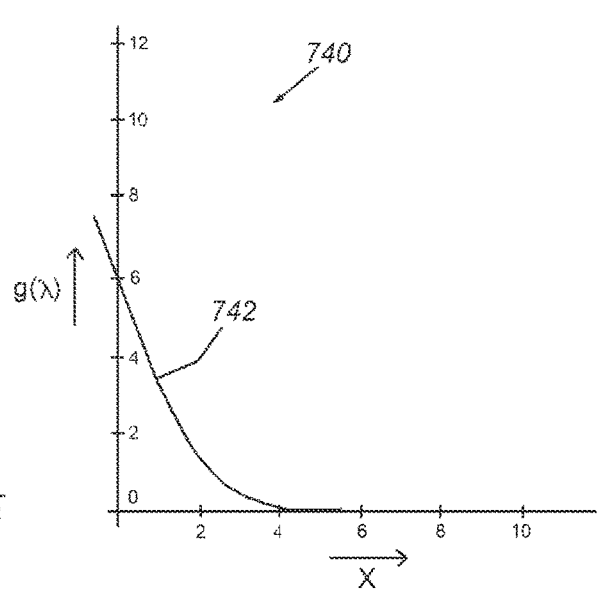

By changing the b parameter (from its normal 0 value), the Gaussian curve 732 is shifted horizontally, as shown in the exemplary graph 730 in FIG. 7B. Since this function (where, e.g., b=2), is not monotonically decreasing in the positive half of the real numbers, and is not an effective function for the embodiment. Likewise, a negative value for b generates the curve 742 in graph 740 of FIG. 7C. As shown, the positive half of the curve 742 exhibits a sharper initial falloff in this example. Such a characteristic (possibly disadvantageously) omits the part of the curve in which falloff is small (for example the region between 0 and 0.001).

Figure 7D:
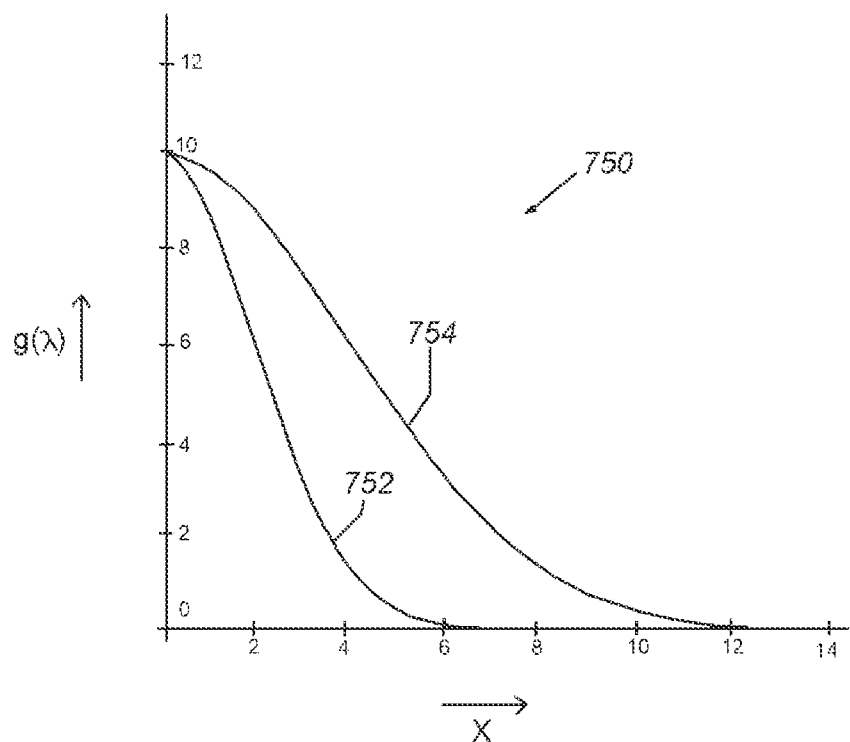

Changing the value of c varies the outward extent of the curve, which can affect how much weight low-information edges are assigned. Thus, to weight low-information edges higher, the value of c can be increased. To weight low-information edges lower, the value of c can be decreased. FIG. 7D shows a graph 750, which depicts the curve 752 of the above-described Gaussian (FIG. 7D), and an additional distribution curve 754 with the value of c equal to 4. In the second curve 754, it should be clear that a low-information edge (one where the eigenvalue is larger) resides further to the right on the x axis), and would be assigned get a higher weight.

It should also be clear that a low eigenvalue is meaningful in the Gaussian (or similar) function, since if the normals do not provide sufficient information about a direction, then the edges should provide such information.

Then, in step 630 of the procedure 600, the weight a of each individual edge is determined by the following formula:

$$\alpha = \Sigma_{i=1}^{3} \sin(\text{angle}(u, v_i)) * g(\lambda_i)$$

where u is the edge and $v_i$ is the $i^{th}$ eigenvector. The formula above implicates two parts. The first part relates to how much information the respective edge contributes to a given direction, and how important that direction is to the overall computation of weight. Thus, if the subject edge contributes significant information and that direction is not provided by the normals, then the computed weight should be high. Any other combination of information and direction-importance should, conversely, result in a low computed weight. Also, since the sine of the angle between the edge and the eigenvector is a measure of how perpendicular the two vectors are, it thereby measures how much information the edge contributes to that respective direction (since edges contribute information to directions perpendicular to themselves). The second part of the above formula relates to how important that respective direction is—if the eigenvalue is small, then the normals do not contribute significant information in that respective direction, and thus, the value $g(\lambda)$ will be large. This is illustrated by the graph 700 in FIG. 7 showing an exemplary plot 710 of $g(\lambda)$ versus eigenvalue $\lambda$. Note that the value for $g(\lambda)$ approaches zero (0) as the value for as $\lambda$ increases (in this example, above about $\lambda=7$)

The computed weight value(s) a are provided to the runtime alignment procedure for edges and normals in step 640. With these weights, the procedure can define the hybrid metric, and then employ standard calculus techniques, known to those of skill, to determine a candidate pose that minimizes this metric in the alignment (e.g. affine transformation, etc.).

Figure 8:
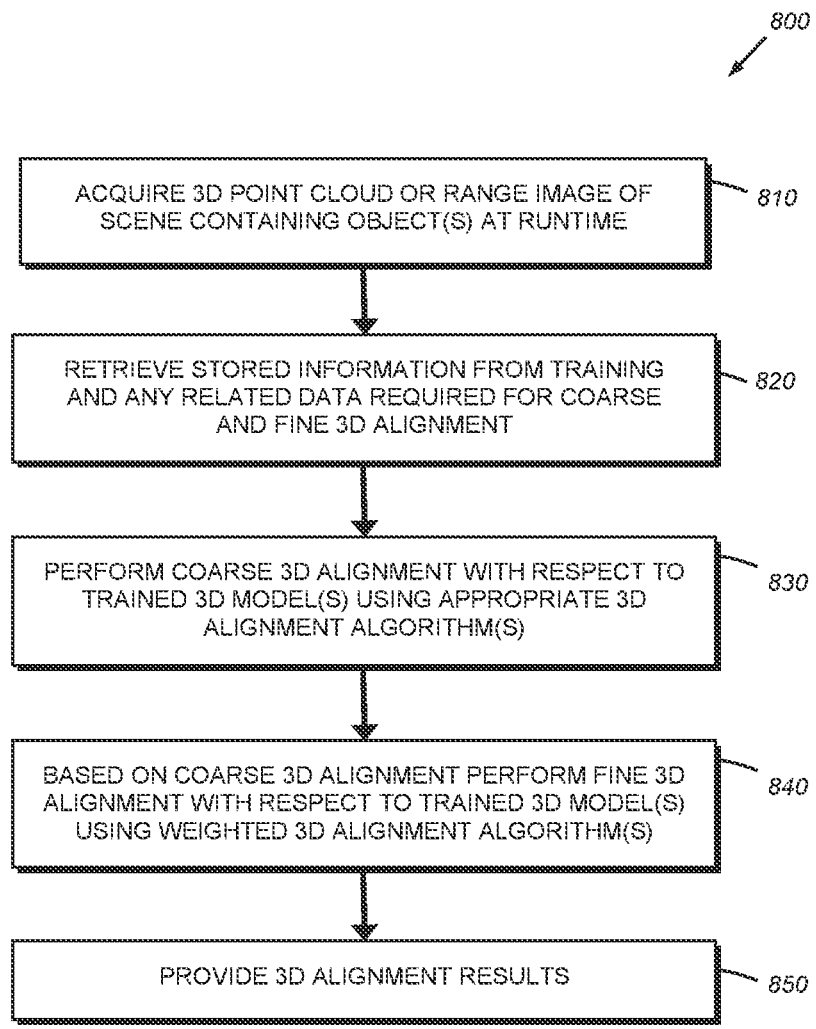
FIG. 8 is a flow diagram of a procedure for applying 3D alignment algorithms with appropriate weighting as determined using the procedure of FIG. 6, during runtime, according to an illustrative embodiment.

Reference is now made to the runtime coarse and fine 3D alignment procedure 800 of FIG. 8. One or more runtime objects are placed within the field of view of one or more 3D cameras and one or more images of the scene are acquired in step 810. In step 820, the stored training/model information is provided for alignment of the runtime image data, and any other data needed to complete the alignment process—threshold values, particular algorithms, settings, etc. (which can occur before or after coarse alignment in step 830, below). A coarse alignment is performed in step 830 in which the identified features of the object(s) are coarsely registered with the model features. This can include comparing the features in the runtime image to various models to provide the closest match—for example an orientation of the model that is closest to the orientation of the runtime features. Coarse alignment can be based on alignment of edges or comparison of source and target surface normals, among other coarse registration techniques.

3D alignment is then refined in step 840, which entails analyzing the object features in the 3D image(s) and determining the characteristics of edges and normals to generate the above-described weightings. These weightings are applied to (e.g.) point-to-line and point-to-plane (and/or ICP-based) procedures in an iterative manner as described above so that candidate 3D poses can be generated. Notably, a candidate pose is generated that simultaneously (concurrently) matches 3D edges in the 3D model to 3D edges in the 3D image and 3D normals in the 3D model to 3D normals in the 3D image. Conventional alignment procedures can then be applied to the poses, for example, resolving certain 3D shapes into 2D images and applying an edge-based affine transformation using vision tools (152 in FIG. 1). The results are then provided for use in follow-on processes, such as quality control, part inspection, robot manipulation and or part assembly in step 850.

III. Conclusion

It should be clear that the above-described system and method for aligning 3D objects with respect to model 3D data effectively deals with the fact that objects can be viewed within an imaged scene in a variety of orientations that do not lend themselves to a particular pose-determination/alignment algorithm. More particularly, the illustrative system and method can make a flexible decision as to whether the use of edges or normals in the acquired 3D feature set is preferred. This generates better results in a more efficient manner.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Note, as defined herein, an "object" can include a section of a planar surface. Also, for example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A method for finding the pose of a 3D model in a 3D image of an object acquired by a 3D camera assembly, comprising the steps of:
   generating a 3D model during training time;
   acquiring a 3D image of an object during runtime; and
   finding, with a processor, a pose that concurrently matches 3D edges in the 3D model to 3D edges in the 3D image and 3D normals in the 3D model to 3D normals in the 3D image,
   wherein the 3D model includes representations of 3D edges and 3D surface normals of the object imaged by the 3D camera assembly.

2. The method of claim 1, wherein the 3D model is generated from a 3D range image or a 3D point cloud.

3. The method as set forth in claim 1, wherein the step of finding comprises applying weightings to 3D edges in the 3D image and 3D normals in the 3D image so as to weight use of 3D edges versus 3D normals in the image.

4. The method as set forth in claim 3, wherein the step of finding determines whether (a) a plane of the object provides information about alignment in directions parallel to the 3D normals, and (b) edges of the object provide information about alignment in one or more directions perpendicular to the edges, respectively.

5. The method as set forth in claim 4, wherein the step of finding includes defining a normal information matrix that represents the directions in which sufficient quantity of the information is present.

6. The method as set forth in claim 5, further comprising, performing a principal component analysis (PCA) on the matrix to identify the information and determine availability thereof for use in the step of finding.

7. The method as set forth in claim 6, wherein the step of performing includes evaluating the edges, respectively, for a quantity of the information contributed in respective directions and the information that is available.

8. The method as set forth in claim 7, wherein the step of performing evaluates edges according to the following:
   (a) if one of the respective edges contribute a significant quantity of the information in a direction that is significant, then that one of the edges is assigned a high weight in the computation, and
   (b) if one of the respective edges does not contribute a significant quantity of the information in a direction that is significant, or if the direction is not significant, then that one of the edges is assigned a relatively low weight in the computation.

9. The method as set forth in claim 1, further comprising, matching the 3D edges in the 3D model to 3D edges in the 3D image using a point-to-line metric.

10. The method as set forth in claim 9, further comprising, matching the 3D normals in the 3D model to the 3D normals in the 3D image using a point-to-plane metric.

11. The method as set forth in claim 1, further comprising, matching the 3D normals in the 3D model to the 3D normals in the 3D image using a point-to-plane metric.

12. The method as set forth in claim 11, further comprising operating a linear minimization function that simultaneously minimizes a sum of distances computed using the point-to-plane metric plus a sum of distances computed using the point-to-edge metric.

13. A method for finding the pose of a 3D model in a 3D image of an object acquired by a 3D camera assembly, comprising the steps of:
   generating a 3D model during training time;
   acquiring a 3D image of an object during runtime; and
   performing a coarse 3D alignment in which identified features in the 3D image are registered with corresponding features of the 3D model;
   refining the coarse 3D alignment by finding, with a processor, a pose that concurrently matches 3D edges in the 3D model to 3D edges in the 3D image and 3D normals in the 3D model to 3D normals in the 3D image.

14. The method of claim 13, wherein the coarse 3D alignment is based upon alignment of edges or comparison of normals in the 3D image and the 3D model.

15. The method of claim 13, wherein the 3D model is generated from a 3D range image or a 3D point cloud.

16. The method of claim 15, wherein the 3D model includes representations of 3D edges and 3D surface normals of the object imaged by the 3D camera assembly.

17. A method for finding the pose of a 3D model in a 3D image of an object acquired by a 3D camera assembly, comprising the steps of:
   generating a 3D model during training time;
   acquiring a 3D image of an object during runtime;
   performing a coarse 3D alignment in which identified features in the 3D image are registered with corresponding features of the 3D model;
   analyzing the identified features in the 3D image to determine characteristics of 3D edges and 3D normals to generate one or more weight values; and
   refining the coarse 3D alignment by finding, with a processor and based upon the one or more weight values, a pose that concurrently matches 3D edges in the 3D model to 3D edges in the 3D image and 3D normals in the 3D model to 3D normals in the 3D image.

18. The method of claim 17, wherein the 3D model is generated from a 3D range image or a 3D point cloud.

19. The method of claim 18, further comprising, at least one of (a) matching the 3D edges in the 3D model to 3D edges in the 3D image using a point-to-line metric (b) matching the 3D normals in the 3D model to the 3D normals in the 3D image using a point-to-plane metric, and (c) matching the 3D normals in the 3D model to the 3D normals in the 3D image using a point-to-plane metric.

* * * * *